Nov. 24, 1936.  R. G. DE LA MATER  2,061,866
TORQUE REACTION DEVICE FOR BRAKES
Filed Sept. 5, 1935
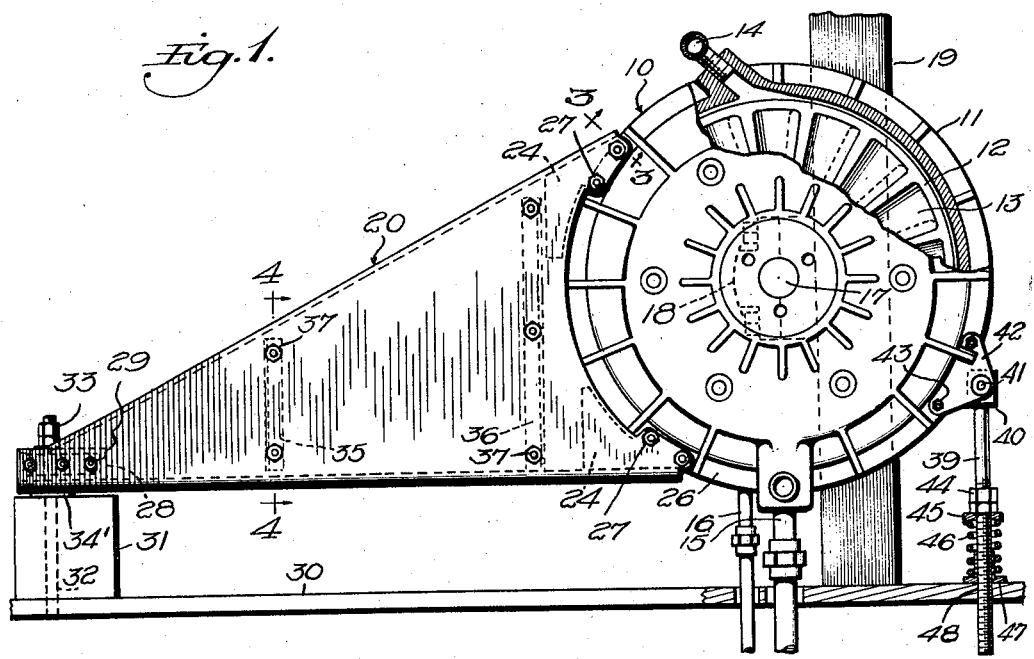
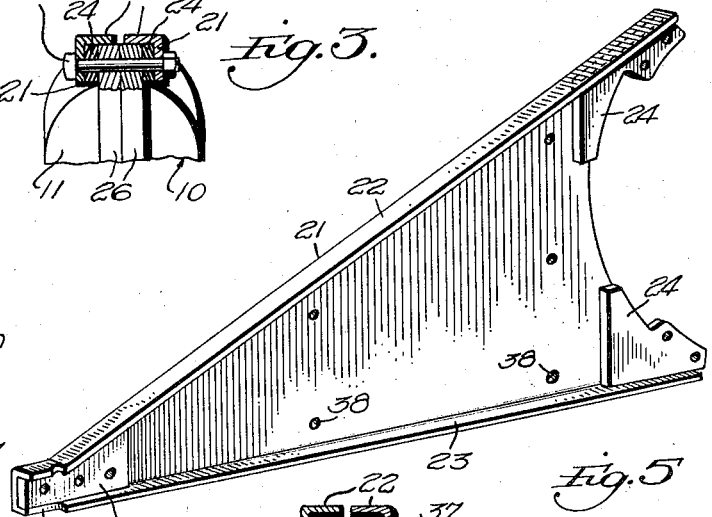
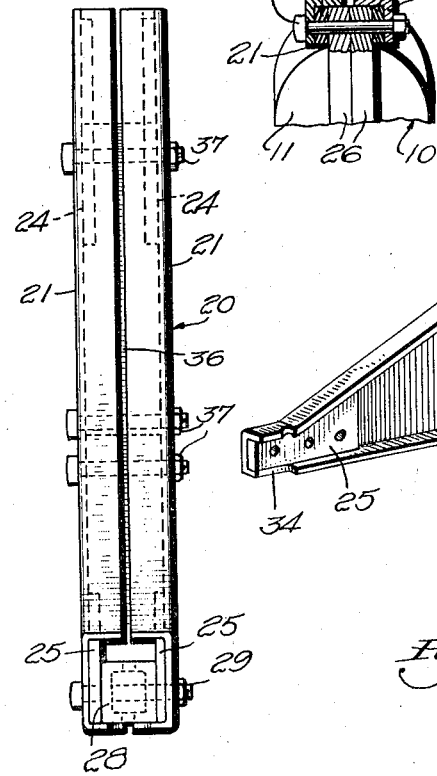
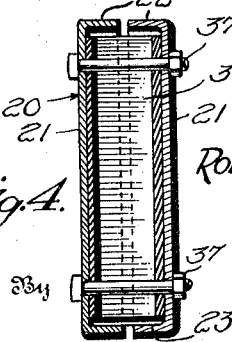
Inventor
ROBERT GRIFFIN DELAMATER
Attorney Patented Nov. 24, 1936

2,061,866

UNITED STATES PATENT OFFICE 2,061,866

TORQUE REACTION DEVICE FOR BRAKES

Robert Griffin De La Mater, Parkersburg, W. Va., assignor to The Parkersburg Rig & Reel Company, Parkersburg, W. Va., a corporation of West Virginia Application September 5, 1935, Serial No. 39,343

12 Claims. (Cl. 188—90)

This invention relates to torque reaction devices for brakes.

In the drilling of oil wells, the sand, calf and bull reels of cable tool drilling rigs, the draw works on rotary drilling rigs, etc., formerly were provided with friction brakes to control the speed of descent of the load suspended from the cables associated with the reels. Such friction brakes are highly disadvantageous for reasons which are now well understood in the art, and to overcome the objections to such prior forms of apparatus, I have developed several types of hydrodynamic brakes for use on the reel shafts. Such systems of braking have been disclosed and claimed in my Patents Nos. 1,992,910, 1,992,911 and 1,992,912, and in the patent of Robert Griffin De La Mater and William Schwemlein, No. 1,985,889.

Hydrodynamic brakes of the type referred to in such prior patents are particularly adapted for use with apparatus of the type referred to wherein heavy loads are raised and lowered. The hydrodynamic brake is provided with a rotor coupled to the reel shaft and rotating within a stator housing, the rotor and stator having pockets or recesses so arranged that with a body of liquid contained within the pockets, negligible resistance is offered to rotation of the shaft in a direction to raise the load. However, substantial resistance is offered to the rotation of the shaft upon the lowering of the load without introducing mechanical surface braking friction. Brakes of this type automatically resist the rotation of the reel shaft to a greater extent as the rotational speed increases and provide a maximum speed of rotation. The friction brake, therefore, need be utilized only for bringing the load to a complete stop, with the resultant advantages outlined in the prior patents referred to.

Obviously it is necessary to provide some means for preventing rotation of the casing or stator of the hydrodynamic brake, and heretofore this has been accomplished in several ways with more or less satisfactory results. In the prior patents referred to, the stator casing is illustrated as being made fast to a suitable foundation, and in the practical installations of the apparatus, front and rear torque bars were connected at one end to the stator casing and at the other end to a stationary support such as the base or foundation of the apparatus. The torque bars were substantially vertically arranged and their upper ends were secured to the stator casing whereby it will be apparent that the bars were substantially tangentially arranged with respect to the stator casing.

Such means for anchoring the stator casing were open to serious disadvantages. For example, due to looseness of the bearings in the shaft itself, vibration of the rig, and the fact that the shaft assembly may move vertically to some extent relative to the stationary support for the torque bars when the brake is operating, there was present a continuous pounding action on the bearings and packing of the brake. In practice it is not uncommon for the hoist shaft to be slightly kinked, and in such case, when the brake is mounted on a portion of the shaft extending outwardly of one of the bearings, the extended end of the shaft is subjected to an additional elliptical motion. While these disadvantages did not prevent the hydrodynamic brake from functioning in the desired manner, they minimized the life of both the packing and the bearings of the brake. Moreover, there was always the possibility that the torque bars might be knocked out of place, in which case the brake housing would be free to rotate and could cause considerable damage.

The present invention was developed with the particular idea of overcoming the disadvantages of the prior torque take-up devices for hydrodynamic brakes, and generally speaking, the principal object of the invention is to provide torque reaction means for a brake of this character which minimizes the destructive effects which have been found to take place with respect to the bearings and packing of the brake and very greatly lengthens the life of these elements.

A further object is to provide a brake reaction device which permits of a floating action of the stator casing of the brake transversely with respect to the axis of rotation, thus substantially eliminating the pounding action usually present on the bearings and packing of the brake.

A further object is to provide means for absorbing torque reactions of the brake casing in both directions and to coordinate such means for cushioning torsional vibration and shocks so as to increase the efficiency of the braking apparatus and increase the life of the elements thereof.

A further object is to provide an apparatus of the character referred to which is readily capable of being dismounted with respect to the brake to permit the latter to be removed from the shaft with which it is associated.

Other objects and advantages of the invention will become apparent during the course of the following description.

In the drawing I have shown one embodiment of the invention. In this showing—

Figure 1 is a face view of a hydrodynamic brake showing the torque take-up means connected thereto, parts being broken away, Figure 2 is an end elevation of the torque arm, Figure 3 is a detail sectional view on line 3—3 of Figure 1, parts being shown in elevation, Figure 4 is a vertical sectional view on line 4—4 of Figure 1, and, Figure 5 is a detail perspective view of one of the torque arm sections.

Referring to the drawing the numeral 10 designates the hydrodynamic brake as a whole, this brake being of the type illustrated, for example, in my prior Patent No. 1,992,911, previously referred to. The brake includes a stator casing 11 having a rotor 12 therein, the stator and rotor being provided with coacting liquid pockets 13 through which the braking action is obtained in the manner disclosed in the prior patents referred to, upon rotation of the rotor within the stator casing. The stator casing is provided with an outlet 14 by means of which the liquid passes from the stator casing to a circulating tank. From this tank the liquid returns to the brake through an inlet pipe 15. The liquid may be drained from the brake through a suitable pipe 16.

Referring to Figure 1 the numeral 17 designates the shaft of the apparatus in connection with which the brake is employed, such as the shaft of a sand, calf or bull reel, or the shaft of the draw works of a rotary drilling rig. This shaft is supported in suitable bearings one of which is indicated by the numeral 18, this bearing being carried by a post 19 or other part of the apparatus with which the brake is employed. While the application of the brake is not limited to any particular part of the shaft 17, it is generally practicable with most types of apparatus to mount the brake on a shaft extension arranged wholly outwardly of one of the bearings 18, and such a position of the brake has been illustrated in Figure 1.

Torque reaction on the stator housing 11 when the brake is in operation is taken up by a torque arm illustrated as a whole by the numeral 20. This arm is made up of a pair of complementary sections 21, one of which is illustrated in detail in Figure 5 of the drawing. Each of the sections 21 tapers to decrease in height toward the end remote from the brake, and each section is flanged at its upper and lower edges as at 22 and 23. Reinforcing plates 24 are secured to the top and bottom portions of each section 21 adjacent its inner end, these plates preferably being welded in position. A reinforcing plate 25 is also preferably welded against the inner face of each section 21 adjacent its outer end.

When the two sections 21 are placed in operative position with respect to each other, the reinforcing plates 24 engage against opposite sides of a peripheral flange portion 26 forming an integral part of the stator casing 11. The torque arm is secured with respect to the stator casing by bolts 27, as clearly shown in Figures 1 and 3. At the outer end of the torque arm a spacer 28 is arranged between the plates 25, and bolts 29 secure the adjacent ends of the torque arm sections against the spacer 28, as shown in Figure 2.

The apparatus is arranged over a base 30 which carries a relatively heavy block 31 from which a bolt 32 projects upwardly. This bolt extends through the spacer 28 and carries nuts 33 at its upper end, as shown in Figure 1. The flange 23 of each torque arm section may be cut away as indicated by the numeral 34 in Figure 5 for the passage of the bolt 32 between the torque arm sections. A rubber or similar cushion block 34' in the nature of a washer is preferably interposed between the block 31 and the outer end of the torque arm 20. In order to rigidly connect the torque arm sections with respect to each other, vertical channels or similar spacing elements 35 and 36 may be arranged with their base portions seating against the inner faces of the torque arm sections, and the latter sections are secured in position against the spacers by means of bolts 37 passing through openings 38 formed in the sections 21.

A torque bar 39 is arranged forwardly of the stator casing 11, as shown in Figure 1. This bar has a block 40 at its upper end pivotally connected as at 41 to plates 42 secured to the stator casing flange 26 as at 43. The bar 39 is provided with nuts 44 threaded thereon and the lower of these two nuts seats on a washer 45 engaging the upper end of a compression spring 46. The lower end of this spring engages a thimble 47 seated on the base 30, and the lower end of the bar 39 projects freely through an opening 48 formed in the base 30.

The operation of the apparatus is as follows:

When the load is to be elevated, the shaft 17 is driven by the motor usually provided for this purpose, and during such operation no braking action is effected by the hydrodynamic brake, as completely disclosed in the prior patents referred to. When the load is released for descent into the well, the brake comes into operation to effect a retarding action on the shaft 17, and the braking action progressively increases upon the progressive increasing of the speed of rotation of the shaft 17. The speed of rotation of the shaft will finally reach a maximum point, and the brake will automatically function to prevent increased rotation of speeds. The mode of operation of the brake in performing the functions referred to also is fully disclosed in the prior patents indicated above.

During the performance of the braking operation the reaction of the stator casing 11 is in a counter-clockwise direction as viewed in Figure 1, and the torque arm 20 provides adequate means for taking up the torque reaction of the stator casing. The cushion member 34' largely absorbs sharp sudden downward impulses on the outer end of the torque arm, thus tending to reduce the transmission of strains to the bearings and packing of the pump.

With the earlier types of torque reaction devices referred to above, movement of the stator casing 11 was accompanied by the transmission of direct thrusts through the tangential torque bars employed. The transmission of such forces on the rear torque bar, that is, the bar secured to the side of the stator casing corresponding to the side to which the torque arm 20 is connected, resulted in the creation of an upward reaction of the stator casing 11 which transmitted destructive forces to the brake bearings and packing. Due to the greater lever arm present in the construction illustrated, it has been found that this upward reaction is reduced approximately 75 per cent., thus reducing bearing pressure and materially increasing the life of the bearings and packing. In this connection it will be noted that a radius of the shaft 17 passing approximately through the point of anchorage in the outer end of the arm 20 will constitute substantially the medial line of the torque arm. In other words, a line substantially bisecting the angle between the upper and lower edges of the arm 20 will pass through the center of the shaft 17. This arrangement is of importance in that it permits the vertical floating action of the stator casing.

As previously stated, there are several causes for the transmission of the pounding action on the bearings and packing of the brake. For example, looseness of the bearings in the hoist shaft itself, the normal vibration of the rig, or the kinking of the shaft may cause such pounding action, and this irregularity of movement causes movement of the stator casing 11. The torque arm 20 permits such movement of the casing 11, as previously stated, and the operation of the apparatus is thus greatly improved. The shock absorbing pad 34' eliminates much of the shock attending the operation of the brake, especially the vertical jumping of the formerly used torque bar.

During the operation of the shaft 17 for elevating the load, slight reactions of the stator housing 11 occur due largely to the friction of the bearings, etc., although the brake does not operate under such conditions to resist the turning movement of the shaft 17. The slight reactions which do occur under such conditions are absorbed by the spring 46 of the torque bar 39. The arrangement is such that the spring may be compressed and exert an upward reaction which holds the brake housing upwardly when the shaft 17 is operating under the conditions referred to. Moreover, when the shaft assembly of the hoist moves vertically relative to the derrick floor under braking conditions, the spring 46 causes the brake to move with the shaft without subjecting the assembly to the shock and vibration previously experienced. Accordingly it will be apparent that the combination of the torque arm 20 with the spring mounted torque bar 39 permits the brake to move freely with the shaft under all operating conditions and with a minimum of shock and damage to the bearings and packing of the brake. The latter elements accordingly wear for long periods of time and the brake operates perfectly for its intended purpose.

As previously stated, most installations of the brake are made on an end of the shaft projecting outwardly of one of the bearings 18. This arrangement is preferred because of the accessibility which it provides and because the brake may be more readily arranged in such position without interfering with any of the other parts of the apparatus or requiring the re-designing or re-locating of such parts. Such arrangement permits the brake to be readily removed from a given apparatus for any purpose, such as the transferring of the brake to some other apparatus, and the form of the present invention illustrated facilitates the removal of the brake. For example, the bolts 27, 29 and 37 may be removed, thus permitting the outer torque arm section 21 to be removed. The bolt 41 may be removed together with the pipe connections 14, 15 and 16, whereupon the outer casing section of the stator 11, or the entire brake structure, may be readily removed. Thus it will be apparent that the present invention is highly advantageous both from the standpoint of operation, and assembling and disassembling.

The present invention has been particularly described with relation to oil well apparatus of various types, and in connection with the use of such apparatus with a hydrodynamic brake. It will be apparent however, that the invention is not so limited in its use, but is applicable for use with any type of brake associated with rotary shafts wherein the braking action generates a substantial torque reaction.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a rotary shaft, of a brake including a pair of parts one of which is secured to said shaft, and torque reaction means for the other brake part comprising a relatively long arm formed of a pair of sections divided from end to end in a plane at right angles to the axis of said shaft, said sections having their ends adjacent said other brake part arranged against opposite sides thereof and secured thereto, the other ends of said sections being anchored at a point offset a substantial distance laterally with respect to said shaft.

2. The combination with a rotary shaft, of a brake including a pair of parts one of which is secured to said shaft, and torque reaction means for the other brake part comprising a relatively long arm formed of a pair of sections divided from end to end in a plane at right angles to the axis of said shaft, said sections having their ends adjacent said other brake part arranged against opposite sides thereof, removable means for securing said ends of said sections against opposite sides of said other brake part, the other end of said arm being anchored at a point laterally offset a substantial distance from said shaft, and removable means for securing said sections to each other.

3. The combination with a rotary shaft, of a brake including a pair of parts one of which is secured to said shaft, and a pair of oppositely acting torque reaction means for the other brake part respectively comprising a relatively long arm rigidly secured at one end to said other brake part at a point spaced from the center thereof and having its other end anchored at a point offset a substantial distance laterally with respect to said shaft, and a resilient torque reaction device connected to said other brake part at a point spaced from the center thereof.

4. The combination with a rotary shaft, of a brake including a pair of parts one of which is secured to said shaft, and a pair of oppositely acting torque reaction means for the other brake part respectively comprising a relatively long arm rigidly secured at one end to said other brake part at a point spaced from the center thereof and having its other end anchored at a point offset a substantial distance laterally with respect to said shaft, and a torque bar secured at one end to said other brake part at a point spaced from the center thereof and arranged substantially tangentially with respect thereto, said torque bar having resilient cushioning means operative longitudinally thereof.

5. The combination with a rotary shaft, of a brake including a pair of parts one of which is secured to said shaft, and a pair of oppositely acting torque reaction means for the other brake part respectively comprising a relatively long arm rigidly secured at one end to said other brake part at a point spaced from the center thereof and having its other end anchored at a point offset a substantial distance laterally with respect to said shaft, and a torque bar secured at one end to said other brake part at a point spaced from the center thereof and extending substantially tangentially thereof, a stationary support, and spring means arranged between said support and said torque bar.

6. The combination with a rotary shaft, of a brake including a pair of parts one of which is secured to said shaft, and a pair of oppositely acting torque reaction means for the other brake part respectively comprising a relatively long arm rigidly secured at one end to said other brake part at a point spaced from the center thereof and having its other end anchored at a point offset a substantial distance laterally with respect to said shaft, a torque bar secured at one end to said other brake part at a point spaced from the center thereof and extending substantially tangentially thereof, a stationary support having an opening loosely receiving the other end portion of said torque bar, and a compression spring surrounding the last named end portion of said torque bar and engaging said support and said torque bar to cushion movement of the latter.

7. A torque reaction device comprising an arm formed of a pair of sections arranged in parallel relation, said arm having attaching means at opposite ends, and removable means for securing said sections together.

8. A torque reaction device comprising an arm formed of a pair of sections arranged in parallel relation, said sections being tapered to increase in width toward one end, attaching means for the wider ends of said sections, anchoring means for the other end of said arm, spacing means arranged between said sections, and removable means for securing said sections against said spacing means.

9. A torque reaction device comprising an arm formed of a pair of sections arranged in parallel relation, said sections being tapered to increase in width toward one end, attaching means for the wider ends of said sections, a spacing and anchoring member removably secured between the other ends of said sections, and means for removably securing said sections together.

10. A torque reaction device comprising an arm formed of a pair of sections arranged in parallel relation, said sections being tapered to increase in width toward one end, attaching means for the wider ends of said sections, a spacing and anchoring member removably secured between the other ends of said sections, spacing means arranged between said sections intermediate their ends, and removable means for clamping said sections against said spacing means.

11. A torque reaction device comprising an elongated arm formed of a pair of sections arranged in parallel relation, said sections being tapered to increase in width toward one end and being provided at opposite edges of their wider ends with attaching means, the attaching means of each section corresponding in position to and being spaced from the attaching means of the other section, anchoring means for the other ends of said sections, and means for securing said sections to each other.

12. A torque reaction device comprising an elongated arm formed of a pair of sections arranged in parallel relation, said sections being tapered to increase in width toward one end and being provided at opposite edges of their wider ends with attaching means, the attaching means of each section corresponding in position to and being spaced from the attaching means of the other section, a spacing and anchoring device secured between the other ends of said sections, spacing means arranged between said sections intermediate the ends thereof, and removable means for securing said sections against said spacing means.

ROBERT GRIFFIN DE LA MATER.